United States Patent [19]

Davis et al.

[11] 4,340,713

[45] Jul. 20, 1982

[54] METHOD FOR PREPARING HIGH MOLECULAR WEIGHT EPOXY RESINS CONTAINING HYDROLYZED EPOXY GROUPS

[75] Inventors: Rhetta Q. Davis; Michael B. Cavitt, both of Lake Jackson, Tex.

[73] Assignee: The Dow Chemical Company, Midland, Mich.

[21] Appl. No.: 210,475

[22] Filed: Nov. 26, 1980

[51] Int. Cl.³ .................... C08G 59/14; C08G 59/62
[52] U.S. Cl. ........................... 528/89; 525/507; 525/523; 528/88; 528/91; 528/92; 528/93; 528/104; 528/110; 528/406
[58] Field of Search .............. 528/88, 89, 91, 92, 528/93, 104, 110, 406; 525/507, 523

[56] References Cited

U.S. PATENT DOCUMENTS

| | | | |
|---|---|---|---|
| 3,405,093 | 10/1968 | Walker | 260/47 |
| 3,632,836 | 1/1972 | Walker | 260/830 R |
| 3,787,508 | 1/1974 | Walker | 260/613 R |
| 3,824,212 | 7/1974 | Sinnema et al. | 528/93 |
| 3,891,525 | 6/1975 | Irwin et al. | 204/181 |
| 3,991,028 | 11/1976 | Irwin et al. | 260/29.4 R |
| 4,122,067 | 10/1978 | Anderson | 528/89 |
| 4,145,324 | 3/1979 | Chen | 260/29.4 R |
| 4,215,210 | 7/1980 | Okayama et al. | 528/89 X |

*Primary Examiner*—Earl A. Nielsen
*Attorney, Agent, or Firm*—J. G. Carter

[57] ABSTRACT

High molecular weight epoxy resins containing hydrolyzed epoxy groups are prepared by reacting (A) a low molecular weight epoxy resin and (B) a hydroxyl-containing compound in the presence of (C) water (D) a hydrolysis catalyst and (E) a catalyst for effecting the reaction between (A) and (B).

12 Claims, No Drawings

METHOD FOR PREPARING HIGH MOLECULAR WEIGHT EPOXY RESINS CONTAINING HYDROLYZED EPOXY GROUPS

BACKGROUND OF THE INVENTION

The present invention relates to a process for preparing hydrolyzed epoxy resins.

High molecular weight polyepoxide resins have been made more reactive by blending with a hydrolyzed or partially hydrolyzed low molecular weight or high molecular weight epoxy resin as disclosed by Walker in U.S. Pat. No. 3,632,836.

Hydrolyzed and partially hydrolyzed epoxy resins have been prepared by dissolving the epoxy resin to be hydrolyzed in an inert organic solvent, admixing the resultant solution with a dilute aqueous solution of an acid catalyst, heating to a temperature of from about 50° C. to about 374° C., washing to remove the acid catalyst and distilling the solvent to recover the hydrolyzed epoxy resin product. Such process is disclosed by Walker in U.S. Pat. Nos. 3,405,093, 3,632,836 and 3,787,508.

Such process requires the necessity for removing and recovering an organic solvent therefrom, particularly when it is desired to employ the epoxy resins in the high molecular weight form such as in powder coatings, molding powders, epoxy ester resins for coatings, adhesives and the like. The present invention provides a process for preparing high molecular weight epoxy resin compositions containing hydrolyzed epoxy groups during the preparation of the high molecular weight epoxy resin in the absence of an organic solvent. Such a process is obviously desirable from an environmental standpoint.

SUMMARY OF THE INVENTION

The present invention pertains to a process for preparing high molecular weight epoxy resin compositions containing at least one hydrolyzed glycidyl group which process comprises reacting in the absence of an inert organic solvent (A) at least one low molecular weight epoxy resin having an average of more than one glycidyl group per molecule;

(B) at least one compound having an average of more than one hydroxyl group per molecule and (C) water in an amount essentially stoichiometric with the number of glycidyl groups to be hydrolyzed; said reaction being conducted in the presence of (D) a catalytic quantity of a catalyst for effecting the reaction between component (C) and an essentially stoichiometric quantity of glycidyl groups;

(E) a catalytic quantity of a catalyst for effecting the reaction between components (A) and (B);

thereby providing a high molecular weight epoxy resin composition containing at least one hydrolyzed glycidyl group.

The present invention also concerns a process for preparing a high molecular weight epoxy resin containing one or more hydrolyzed glycidyl groups which process comprises (1) mixing
  (A) at least one low molecular weight epoxy resin having an average of more than one glycidyl group per molecule;
  (B) at least one compound having an average of more than one reactive hydroxyl group per molecule;
  (C) water; and
  (D) a catalytic quantity of a catalyst for hydrolyzing glycidyl groups with water;

(2) reacting the resultant mixture at atmospheric pressure and at a temperature below the boiling point of water for a time at which the % epoxide value of the reaction mixture remains substantially constant;

(3) thereafter adding a catalytic quantity of a catalyst for effecting the reaction between components (A) and (B); and (4) continuing the reaction at a temperature of from about 90° C. to about 250° C. for a time at which the % epoxide value of the reaction mixture remains substantially constant;

thereby providing a high molecular weight epoxy resin composition containing one or more hydrolyzed glycidyl groups.

For the purposes herein, the terms low molecular weight and high molecular weight are relative in that it is meant that the high molecular weight epoxy resin has an average molecular weight greater than that of the low molecular weight epoxy resin.

By the term hydrolyzed glycidyl group, it is meant the group represented by the formula

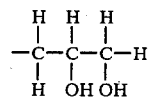

DESCRIPTION OF THE INVENTION

Suitable low molecular weight epoxy resins include, for example, glycidyl ethers of polyhydric aliphatic, cycloaliphatic and aromatic compounds, glycidyl esters of polycarboxylic acids, mixtures thereof and the like.

Particularly suitable are the glycidyl ethers of polyhydric aromatic compounds such as phenols, bisphenols and phenol-aldehyde resins.

Most particularly suitable low molecular weight epoxy resins which can be employed herein include those represented by the formulas

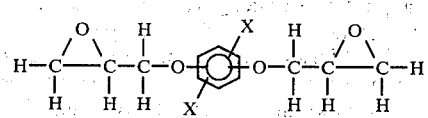

(I)

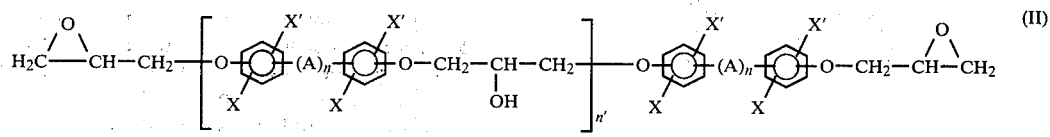

(II)

-continued

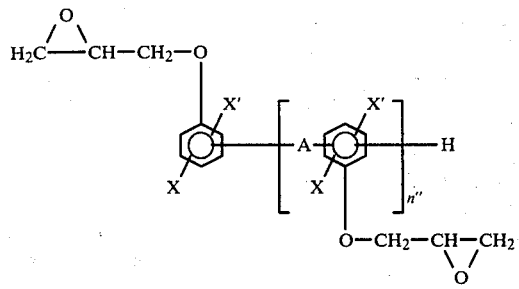
(III)

wherein A is a divalent hydrocarbon group having from one to about 8 carbon atoms, —O—, —S—, —S—S—,

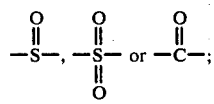

each X and X' is independently hydrogen, bromine, chlorine or a hydrocarbon group having from 1 to about 8 carbon atoms; n has a value of zero or 1; n' has an average value less than about 0.9, preferably less than about 0.2 and most preferably from about 0.001 to about 0.15 and n" has a value of from about 0.001 to about 5, preferably from about 0.1 to about 2.5.

Suitable compounds having an average of more than one hydroxyl group per molecule which can suitably be employed herein include, for example, aliphatic, cycloaliphatic and aromatic compounds having a plurality of hydroxyl groups.

Suitable aliphatic hydroxyl-containing compounds include, for example, ethylene glycol, propylene glycol, diethylene glycol, dipropylene glycol, polyoxypropylene glycols, glycerine, pentaerythritol, neopentyl glycol, dibromoneopentyl glycols and the like.

Particularly suitable dihydric phenols which can be employed herein include those represented by the formulas

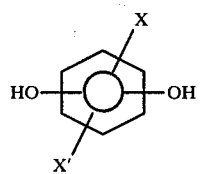
(IV)

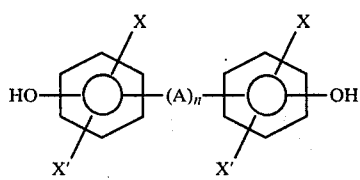
(V)

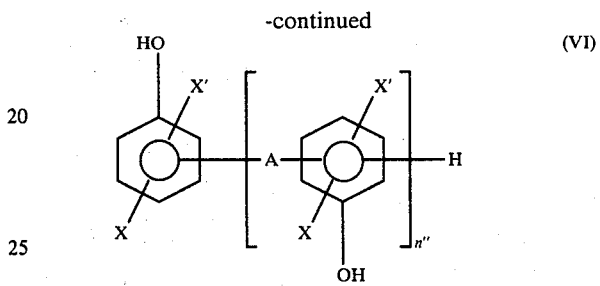
(VI)

wherein A, X, X', n and n" are as defined above.

Suitable catalysts which can be employed as component (E) in the process of the present invention when component (B) is an aromatic hydroxyl-containing compound include any catalyst which will catalyze the reaction between a vicinal epoxy group and a phenolic hydroxyl group. Such catalysts include, for example, those disclosed in U.S. Pat. Nos. 3,306,872; 3,341,580; 3,379,684; 3,477,990; 3,547,881; 3,637,590; 3,843,605; 3,948,855; 3,956,237; 4,048,141; 4,093,650; 4,131,633; 4,132,706; 4,171,420; 4,177,216 which are incorporated herein by reference.

Particularly preferred catalysts are those quaternary phosphonium and ammonium compounds such as, for example, ethyltriphenylphosphonium chloride, ethyltriphenylphosphonium bromide, ethyltriphenylphosphonium iodide, ethyltriphenylphosphonium acetate, ethyltriphenylphosphonium diacetate (ethyltriphenylphosphonium acetate.acetic acid complex), tetrabutylphosphonium chloride, tetrabutylphosphonium bromide, tetrabutylphosphonium iodide, tetrabutylphosphonium acetate, tetrabutylphosphonium diacetate (tetrabutylphosphonium acetate.acetic acid complex), butyltriphenylphosphonium tetrabromobisphenate, butyltriphenylphosphonium bisphenate, butyltriphenylphosphonium bicarbonate, ethyltriphenylphosphonium bisphenate, benzyltrimethylammonium chloride and tetramethylammonium hydroxide.

Suitable catalysts which can be employed as component (E) when component (B) is an aliphatic- or cycloaliphatic-containing hydroxyl compound include the Lewis acids such as, for example, boron trifluoride, stannic chloride, aluminum chloride, ferric chloride, aluminum bromide, zinc chloride, silicon tetrachloride, titanium chloride, mixtures thereof and the like.

The quantities of epoxy resin and hydroxyl-containing compounds employed are that required to obtain the desired molecular weight and are usually employed in such quantities as will provide an epoxide:total phenolic hydroxyl ratio of from about 40:1 to about 1.2:1, preferably from about 10:1 to about 1.5:1.

The quantity of catalyst component (D) employed depends upon the particular reactants and catalyst being utilized and is usually in the range of from about 0.1 to about 10 millimoles, preferably from about 0.2 to about 6 millimoles per equivalent of the epoxide reactant. Higher quantities of catalyst are desired when higher molecular weight products are to be prepared.

The temperature at which the reaction can be conducted depends upon the particular reactants and catalysts employed but usually ranges from about 25° C. to about 300° C., preferably from about 90° C. to about 250° C.

The higher the temperature and the higher the concentration of catalyst, the less time that is required for the reaction to reach a specific degree of completion.

The excess water can be removed by any suitable means such as, for example, vacuum distillation, molecular sieves, inert gas purge at elevated temperatures and the like; however, it is preferred to remove the excess water by vacuum distillation.

The extent of hydrolysis depends upon the reaction conditions and amount of water. However, at constant reaction conditions, the greater the excess quantity of water the greater the hydrolysis.

Suitable hydrolysis catalysts for reacting water with a glycidyl group include any suitable acid or base catalyst. Particularly suitable are the acids disclosed in U.S. Pat. No. 3,405,093 which is incorporated herein by reference.

The catalyst for the hydrolysis reaction can be employed in any suitable quantity which catalyzes the reaction which is usually from about 0.01 to about 20, preferably from about 0.1 to about 0.7 percent by weight based upon the amount of low molecular weight epoxy resin.

While the applicants herein do not wish to be held by this particular theory, it is believed that the majority of the hydrolysis occurs before the resin advancement i.e., before the reaction between the low molecular weight epoxy resin and the dihydric phenol.

The theoretical percent epoxide is calculated by the following formula $$\text{THEORETICAL \% EPOXIDE} = \frac{4300 \, (EqER - EqOH)}{WtER + WtOH}$$

EqER = epoxide equivalents from the epoxy resin.
EqOH = hydroxyl equivalents from the hydroxyl-containing compound.
WtER = weight of epoxy resin employed.
WtOH = weight of hydroxyl-containing compound employed.

The percent hydrolysis is determined as follows:

$$\text{\% hydrolysis} = \frac{TPE \, A \, \& \, B - TPE \, A, \, B \, \& \, D}{TPE \, A \, \& \, B} \times 100$$

wherein:
TPE A & B = theoretical % epoxide after reaction of A & B
TPE A, B & D = theoretical % epoxide after reaction of A, B & D The following examples are illustrative of the invention but are not to be construed as to limiting the scope of the invention in any manner.

EXAMPLES 1-4

A series of high molecular weight epoxy resins were prepared by adding to a Parr autoclave reactor the indicated quantities of a diglycidyl ether of bisphenol A having an epoxide equivalent weight (EEW) of about 184, bisphenol A, water, as a catalyst for reacting the epoxy resin with bisphenol A, ethyltriphenylphosphonium acetate.acetic acid complex as a 70% solution in methanol and as a catalyst for hydrolysis, oxalic acid dihydrate. The reaction temperature and time was 120°–140° C. for one hour and 190° C. for one hour followed by the application of a vacuum for 30 minutes to remove any unreacted matter. The quantities of reactants and results are given in the following Table.

| COMPONENT AND PRODUCT PROPERTY | EXAMPLE 1 | EXAMPLE 2 | EXAMPLE 3 | EXAMPLE 4 |
| --- | --- | --- | --- | --- |
| EPOXY RESIN (ER) grams equiv. | 857.3 | 857 | 820 | 790.3 |
|  | 4.659 | 4.658 | 4.457 | 4.295 |
| BISPHENOL A (BPA), grams equiv. | 145 | 150 | 180 | 209.7 |
|  | 1.272 | 1.316 | 1.579 | 1.839 |
| WATER (W), grams equiv. | 27.5 | 10 | 10 | 9.22 |
|  | 1.528 | 0.556 | 0.556 | 0.512 |
| EQUIV. RATIO, EP/BPA/W | 1/.273/.328 | 1/.283/.119 | 1/.354/.125 | 1/.428/.119 |
| THEORETICAL EEW[1] | 557 | 365 | 436 | 521 |
| ACTUAL EEW | 574 | 383 | 446 | 518 |
| % HYDROLYSIS (THEORETICAL) | 45 | 17 | 20 | 21 |
| % HYDROLYSIS (actual[2]) | 48 | 21 | 22 | 21 |
| VISCOSITY @ 150° C., centistokes | 260 | 80 | 180 | 355 |

[1]The theoretical EEW includes the reaction with water.
[2]The actual % hydrolysis was determined by change in % epoxide.

EXAMPLE 5

The hydrolysis reaction can be carried out at atmospheric conditions when the temperature for reaction is below the boiling point of water. For example, 174 g., 1 eq, of a diglycidyl ether of bisphenol A having an EEW of 174; 57 g., 0.4 eq, of bisphenol A; 1.8 g., 0.20 eq, of water and 0.02 moles of oxalic acid when reacted together at 80° C. for between 30–90 min. will contain 0.90 eq. of epoxy. Then the advancement catalyst can be added and the regular resin advancement can be carried out to yield a solid resin having about 7.4% epoxide.

We claim:
1. A process for preparing a high molecular weight epoxy resin composition containing one or more hydrolyzed glycidyl group which process comprises reacting in the absence of an inert organic solvent
   (A) at least one low molecular weight epoxy resin having an average of more than one glycidyl group per molecule;

(B) at least one compound having an average of more than one hydroxyl group per molecule; and
(C) water in an amount essentially stoichiometric with the number of glycidyl groups to be hydrolyzed; said reaction being conducted in the presence of
(D) a catalytic quantity of a catalyst for reacting component (C) with a glycidyl group;
(E) a catalytic quantity of a catalyst for effecting the reaction between components (A) and (B)
thereby providing a high molecular weight epoxy resin composition containing one or more hydrolyzed glycidyl groups.

2. The process of claim 1 wherein component (A) is a glycidyl ether of an aromatic hydroxyl-containing compound; component (B) is an aromatic hydroxyl-containing compound; component (E) is a phosphonium compound and components (A) and (B) are present in quantities which provide an epoxy:hydroxyl ratio of from about 1.2:1 to about 40:1.

3. The process of claim 2 wherein component (A) is a diglycidyl ether of a polyhydric phenol represented by the formulas

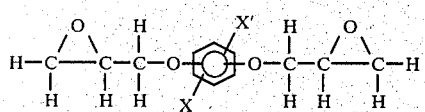

or

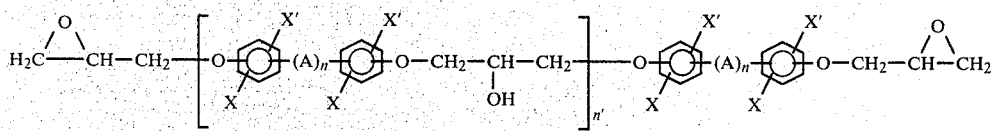

wherein A is a divalent hydrocarbon group having from one to about 8 carbon atoms, —O—, —S—, —S—S—,

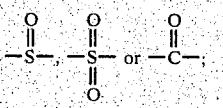

each X and X' is independently hydrogen, bromine, chlorine or a hydrocarbon group having from 1 to about 8 carbon atoms; n has a value of zero or 1 and n' has an average value of less than about 0.9 and component (B) is represented by the formulas

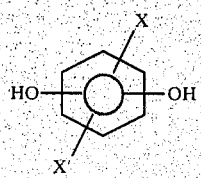

or

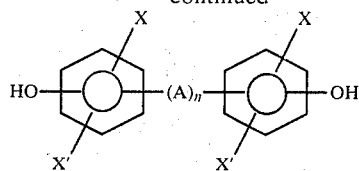

wherein each A, X, X' and n are as defined above and components (A) and (B) are employed in quantities such that the epoxide:hydroxyl ratio is from about 1.5:1 to about 10:1.

4. The process of claim 3 wherein component (A) is an epoxy resin represented by formula II wherein n' has an average value of less than about 0.2 and component (B) is a hydroxyl-containing compound represented by formula V.

5. The process of claim 4 wherein each X and X' is independently hydrogen, chlorine or bromine; each n has a value of 1 and n' has an average value of from about 0.001 to about 0.15.

6. The process of claim 5 wherein component (A) is a

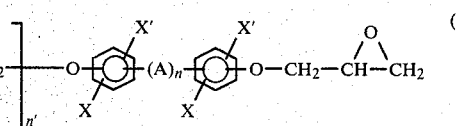

diglycidyl ether of bisphenol A; component (B) is bisphenol A; catalyst (D) is oxalic acid and catalyst (E) is ethyltriphenylphosphonium acetate.acetic acid complex.

7. A process for preparing a high molecular weight epoxy resin containing one or more hydrolyzed glycidyl groups which process comprises
(1) mixing
(A) at least one low molecular weight epoxy resin having an average of more than one glycidyl group per molecule;
(B) at least one compound having an average of more than one reactive hydroxyl group per molecule;
(C) water; and
(D) a catalytic quantity of a catalyst for hydrolyzing glycidyl groups with water;
(2) reacting the resultant mixture at atmospheric pressure and at a temperature below the boiling point of water for a time at which the % epoxide value of the reaction mixture remains substantially constant;
(3) thereafter adding a catalytic quantity of a catalyst for effecting the reaction between components (A) and (B); and
(4) continuing the reaction at a temperature of from about 25° C. to about 300° C. for a time at which the % epoxide value of the reaction mixture remains substantially constant;
thereby providing a high molecular weight epoxy resin composition containing one or more hydrolyzed glycidyl groups.

8. The process of claim 7 wherein component (A) is a glycidyl ether of an aromatic hydroxyl-containing compound; component (B) is an aromatic hydroxyl-containing compound; the catalyst added in step (3) is a phosphonium compound; and step 4 is conducted at a temperature of from about 90° to about 250° C.

9. The process of claim 8 wherein component (A) is a diglycidyl ether of a polyhydric phenol represented by the formulas

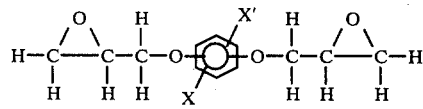

or

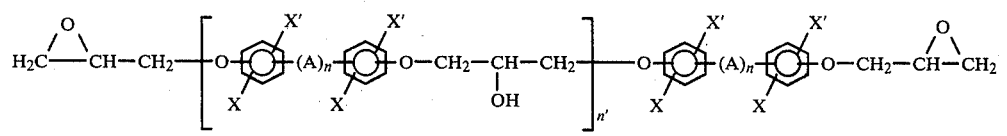

wherein A is a divalent hydrocarbon group having from one to about 8 carbon atoms, —O—, —S—, —S—S—,

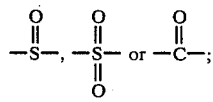

each X and X' is independently hydrogen, bromine, chlorine or a hydrocarbon group having from 1 to about 8 carbon atoms; n has a value of zero or 1 and n' has an average value of less than about 0.9 and component (B) is represented by the formulas

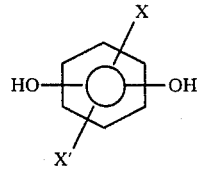

or

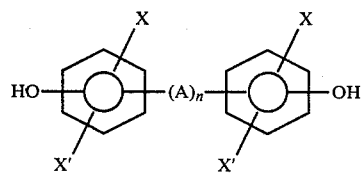

wherein each A, X, X' and n are as defined above.

10. The process of claim 9 wherein component (A) is an epoxy resin represented by formula II wherein n' has an average value of less than about 0.2 and component (B) is a hydroxyl-containing compound represented by formula V.

11. The process of claim 10 wherein each X and X' is independently hydrogen, chlorine or bromine; each n has a value of 1 and n' has an average value of from about 0.001 to about 0.15.

12. The process of claim 11 wherein component (A) is a diglycidyl ether of bisphenol A; component (B) is bisphenol A; component (D) is oxalic acid and the component added in step 3 is ethyltriphenylphosphonium acetate.acetic acid complex.

* * * * *

UNITED STATES PATENT AND TRADEMARK OFFICE
CERTIFICATE OF CORRECTION

PATENT NO. : 4,340,713
DATED : July 20, 1982
INVENTOR(S) : Rhetta Q. Davis and Michael B. Cavitt It is certified that error appears in the above—identified patent and that said Letters Patent is hereby corrected as shown below:

Col. 6, line 55, "0.4 eq. of bisphenol A" should read --0.5 eq, of bisphenol A--.

Signed and Sealed this

Eighth Day of February 1983

[SEAL]

Attest:

Attesting Officer

GERALD J. MOSSINGHOFF

Commissioner of Patents and Trademarks